July 10, 1962  D. G. SMITH  3,043,290
OVEN RACK ELEVATING AND LOWERING MECHANISM
Filed March 1, 1961  2 Sheets-Sheet 2
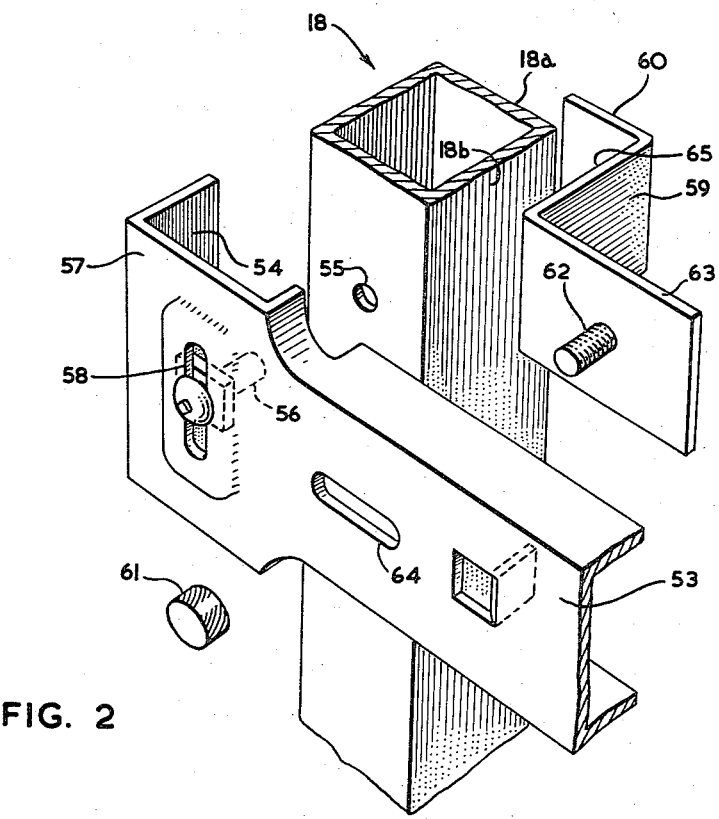
FIG. 2
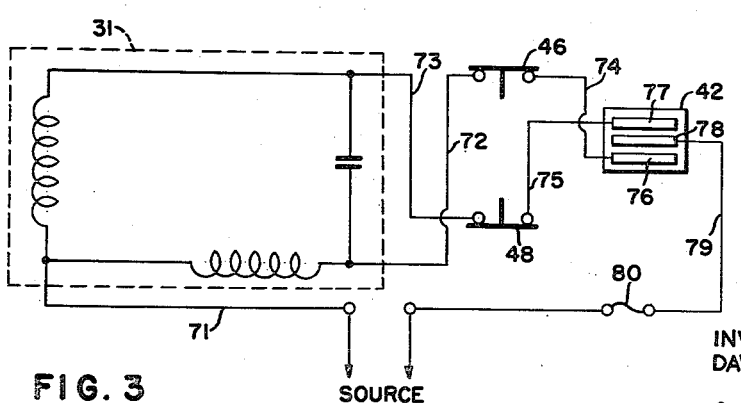
FIG. 3  SOURCE
INVENTOR
DAVID GIBBONS SMITH
BY: Maybee & Legris
ATTORNEYS

United States Patent Office 3,043,290
Patented July 10, 1962

3,043,290
OVEN RACK ELEVATING AND LOWERING MECHANISM
David Gibbons Smith, Toronto, Ontario, Canada, assignor to Moffats Limited, Weston, Ontario, Canada
Filed Mar. 1, 1961, Ser. No. 92,665
1 Claim. (Cl. 126—337)

This invention relates to a movable shelf carrying assembly for the oven of a cooking stove and, in particular, relates to such an assembly which is electrically powered and which may be remotely controlled by means of an electric switch located on the control panel of such a cooking stove.

It is well known that the housewife frequently experiences difficulty and inconvenience in operating a domestic cooking stove as a result of the necessity for locating the article to be baked or cooked in the oven at the proper height either above the lower element or below the upper element. Conventional ovens of cooking stoves provide a rack which may be placed at any one of a number of selected positions by withdrawing the rack from the oven and inserting it at the appropriate height where it is maintained by supporting ridges or ribs formed in the side walls of the oven. Such a construction suffers from the disadvantage that the number of positions available are limited by the number of ribs which are provided, and suffers further from the fact that the withdrawal and reinsertion of the rack or shelf is frequently difficult due to warping of the rack itself, distortion of the oven walls, encrustations of baked-on food which may collect upon either the oven walls or upon the rack itself and, of course, due to the fact that the rack itself may be extremely hot and may require that insulating gloves be worn during this operation.

In the light of these disadvantages of conventional arrangements, the present invention was evolved which has as its principal object, the provision of mechanism whereby the horizontal cooking shelf or rack within an oven can, within certain limits, be moved to an infinite number of positions by a remotely controlled, electrically powered mechanism which will, by the touch of a button, enable the housewife to adjust the rack to precisely the position best suited for the operation which she is about to perform.

The invention will be described by way of example only with reference to the accompanying drawings in which a preferred embodiment is illustrated and in which:

FIGURE 2 is a detailed and enlarged perspective view, partly cut away, of a small portion of the mechanism shown in FIGURE 1, and FIGURE 3 is a circuit diagram of the electrical components of the invention.

Figure 1:
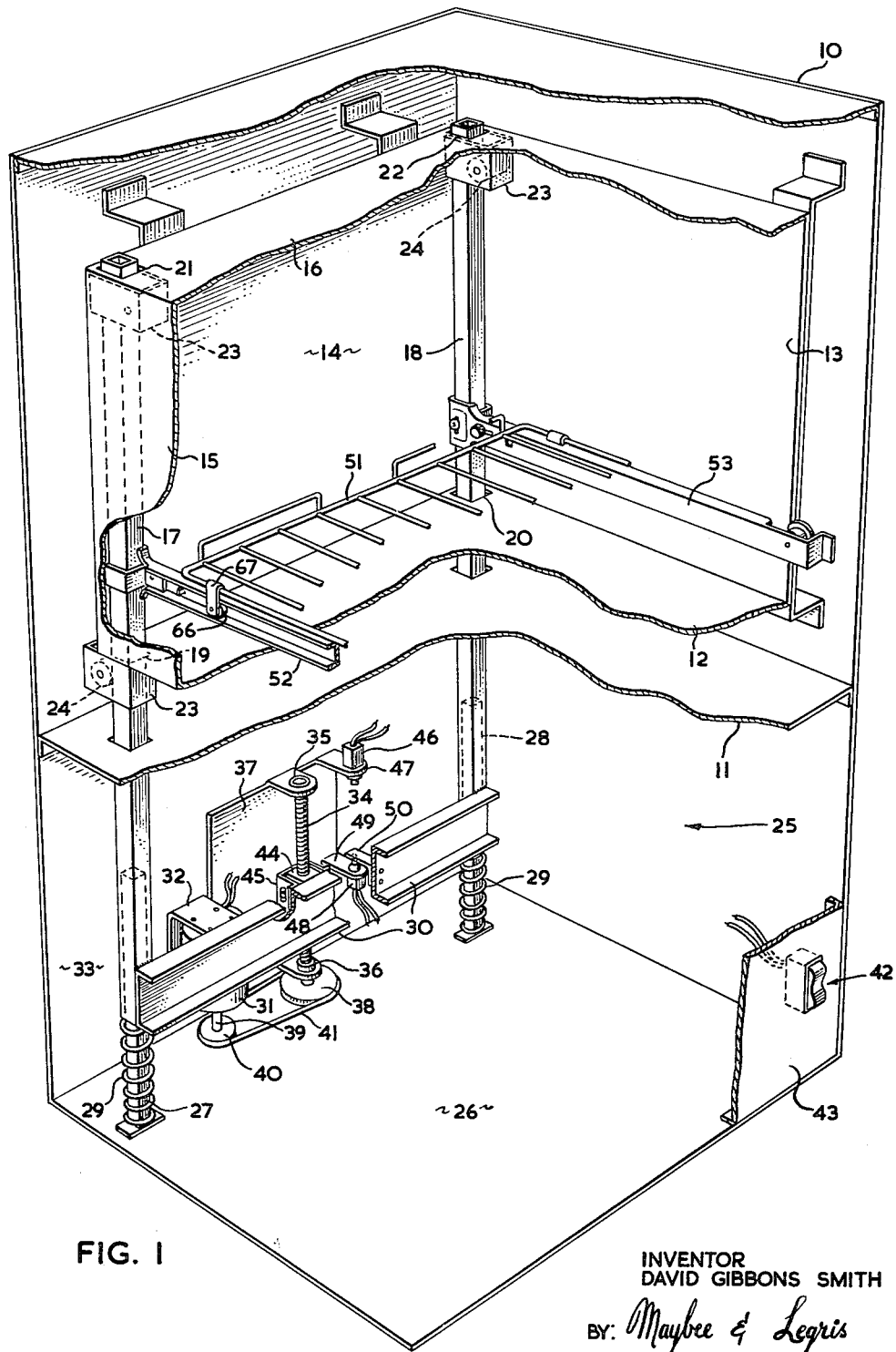
FIGURE 1 is a perspective view, partly cut away, of a mechanism embodying the present invention.

Before proceeding with a detailed description of the invention disclosed in the accompanying drawings it is desired to emphasize that the drawings, although they disclose a mechanism which fulfills all the requirements of the present invention and which, in many environments, would be found perfectly satisfactory, is to be construed only as an illustrative mechanism which is capable of modification, redesign, variation and other change which might well be dictated by the nature of the coking stove within which the invention is to be embodied. Such variations and modifications can well be made without the exercise of inventive skill after the inventive concept disclosed in this application has been assimilated by the stove manufacturer.

Wtih this preface, a reference to FIGURE 1 will disclose a domestic cooking stove embodied in an outer casing 10, the upper portion of which, defined by a horizontal partition 11, contains an oven defined in turn by a bottom wall 12, a first side wall 13, a rear wall 14, a second side wall 15, and a top wall 16. The forward portion of the oven and of the outer casing 10 is not shown since it will be constructed and finished in accordance with conventional practice and will, of course, include a closure for the oven and will, at some convenient location, embody a control panel upon which will be mounted those switches necessary for the operation of the conventional portions of the oven, including the heating elements (not shown) and, in addition, the switch which enables the mechanism of the present invention to be actuated in a manner which will become apparent below.

The invention itself may be conveniently divided into two aspects, one of which is referred to in the claims as a vertically, movable shelf carrying assembly, and the other of which is referred to as a driving assembly. The vertically movable shelf carrying assembly comprises two parallel, vertical columns shown in FIGURE 1 at 17 and 18, these columns extending into the oven through apertures 19 and 20 respectively located in the bottom wall 12 adjacent the rear wall 14, aperture 19 being located also adjacent the side wall 15 and aperture 20 being located adjacent the side wall 13. The columns 17 and 18 extend upwardly through the oven and pass out of the oven through upper apertures 21 and 22 respectively, each of the apertures 19, 20, 21 and 22 having associated therewith guide means 23 only three of which are shown in the drawings, the fourth being concealed beneath the bottom wall 12 and associated with aperture 20.

The guide means 23 also include anti-friction means in the form of rollers 24, the rollers 24 in the guide means 23 associated with apertures 19 and 20 lying to the rear of the columns 17 and 18 and rollers 24 in guide means 23 associated with apertures 21 and 22 lying forwardly of the columns 17 and 18. This positioning of the rollers enables them to best reduce the friction on the columns 17 and 18 as they pass through the apertures when the shelf carried by these columns is under load in a manner which will be set forth below.

The columns 17 and 18 extend downwardly through the bottom wall 12 of the oven, through the partition 11 and into the area indicated generally by the reference character 25 lying below the partition 11. As will be seen from FIGURE 1, the columns 17 and 18 are of rectangular cross-section and are hollow and lie, each in telescoping engagement over a support and guide post extending upwardly from a lower frame member such as the bottom wall 26 of the casing 10. The guide post lying within the column 17 bears reference character 27 and the guide post lying within column 18 bears reference character 28. Coil springs 29 are employed, one surrounding guide post 27 and one surrounding guide post 28, the coil springs bearing at their lower end on the frame member or bottom wall 26 and, at their upper ends, bearing on the lower ends of the columns 17 and 18 in a manner which can clearly be seen from the drawings. These springs act in the manner of counterbalances and urge the columns upwardly against the influence of gravity and against the influence of any load which may be carried by the horizontal cooking shelf lying within the oven.

The columns 17 and 18 are rigidly secured together by means of a cross member 30 which may be fastened to the columns 17 and 18 by any convenient means such as, for example, welding.

An electric motor 31 is secured by means of a suitable mounting bracket 32 to a frame member of the stove such as rear wall 33 of the casing 10 and a vertically arranged threaded lead screw 34 is rotatably supported by means of bearings 35 and 36 in an extension 37 of bracket 32.

The lower end of the lead screw 34 is provided with a pulley 38 which is fixed to its end and the vertical shaft 39 of the motor 31 is also provided with a pulley 40 and a belt or other suitable driving means 41 is entrained about the pulleys 40 and 38 so that rotation of the motor 31 will drive the lead screw 34.

The motor 31 is of the reversing type and is connected to one terminal of a source of power labeled "Source" in FIGURE 3 in an electric circuit including the limit switches 46 and 48 and the control switch 42. The control switch 42 may be suitably mounted on a control panel 43 for easy operation. In FIGURE 3 the motor 31, including the condenser 70 may be seen to be wired to the "Source" by lead 71, and to the limit switches 46 and 48 by leads 72 and 73 respectively. These limit switches are normally closed and are connected by leads 74 and 75 respectively to the terminals 76 and 77 of the control switch 42. Terminal 78 of the control switch 42 is connected to the other terminal of the "Source" by lead 79 which includes a fuse 80.

Threaded over the lead screw 34 is a nut 44 which is secured against rotation and to the cross member 30 by means of a bracket 45 which engages the nut 44 in a loose and "sloppy" manner so as to allow for expansion, contraction, misalignment and other contingencies which might otherwise cause high friction losses and binding between the nut 44 and the lead screw 34.

An upper limit switch 46 is provided, mounted upon bracket 47 and a lower limit switch 48 is also provided mounted on bracket 49. An abutment 50 is carried by the cross member 30 and extends therefrom in a manner which enables it to contact and operate the limit switches 46 and 48 in a manner and for a purpose which will be described.

Limit switches 46 and 48 are electrically included in the electrical circuit associated with the motor 31 and the control switch 42 by means of suitable wiring which is entirely conventional and which is, accordingly, not illustrated.

Returning now to that area of the drawing which illustrates the interior of the oven, there will be seen a horizontal cooking shelf or rack 51 which is carried by a pair of arms, one of which is partly shown at 52 and the other of which is fully shown at 53. Each of the arms, referring now to FIGURE 2, is provided, at one end, with a transverse recess 54 into which the column (column 18 in FIGURE 2) is adapted to be received. The cross-sectional configuration of the recess 54 is similar to the cross-sectional configuration of the column 18 and the fit between the two is sufficiently snug to prevent undesirable play and slack, and yet sufficiently free that the engagement between the recess and the column can be readily achieved by a housewife.

Column 18 is provided with an aperture 55 into which extends a locating and locking pin 56 constituted by a bolt and nut secured to the wall 57 of the recess by passing through a vertical slot 58 formed therein. It can be readily seen that the position of the locking pin 56 can be adjusted in a vertical direction within the limtis provided by the length of the slot 58 so that the position of the arm 53 wtih respect to the arm 52 can be adjusted so as to insure that the shelf 51 assumes a perfectly horizontal position which is both desirable and necessary for the proper completion of a cooking operation carried out within the oven.

The column 18 is maintained in engagement within the recess 14 by a clamping member 59 having a flange 60 adapted to engage surface 18a of the column 18 and to bear against surface 18a by the tightening of nut 61 upon threaded stud 62 which extends from flange 63 of the clamping member 59 and which passes through a horizontally arranged slot 64 in arm 53.

The slot 64 enables the position of the clamping member to be adjusted so that not only will flange 60 bear against the column 18 but, in addition, flange 65 may be caused to bear against the surface 18b of the column 18.

In other respects, the arms 53 are relatively conventional in that they are of channel section adapted to receive rollers 66 carried by brackets 67 on the shelf or rack 51 so that the shelf 51 may be rolled out of the oven along the arms so as to be readily accessible for placing an article upon it and may be then rolled back into the oven so that the oven door may be closed.

Returning now to the rollers 24 in guide means 23 associated with apertures 19, 20, 21 and 22 in the bottom and top wall of the oven, it will be appreciated that when the shelf 51 is carrying a load, the arms 53 will act as levers and will tend to urge the upper ends of columns 17 and 18 forwardly and to urge the portions of the columns 17 and 18 passing through the bottom wall 12 in a rearward direction. The location of the rollers 24 in guide means 23 associated with the upper apertures 21 and 22 provides for an anti-friction guide for the upper ends of the columns 17 and 18 and similar remarks hold good for the rollers 24 in guide means 23 associated with the apertures 19 and 20 in the lower or bottom wall 12 of the oven. The provision of the rollers in these locations also reduces the tendency of the lower ends of the columns 17 and 18 to bind in their sliding telescoping movement over the guide posts 27 and 28 to which reference has earlier been made.

Having described the construction of the embodiment of the invention disclosed in the drawings, its operation will now be discussed.

In the drawings, the invention is illustrated with the movable shelf carrying assembly in its lowermost position with abutment 50 in engagement with the lower limit switch 48. Let it be assumed, for the purposes of the further discussion, that the control switch 42 is in a "neutral" position and that no electrical energy is being supplied to the electric motor.

If the control switch 42 is moved to connect the electric motor 31 to the power source in such a manner that it will rotate the motor and hence the lead screw 34 in a direction which will drive the nut in the vertically upward direction, the upward movement of the nut along the lead screw 34 will carry with it the cross member 30, columns 17 and 18, arms 52 and 53, and the cooking shelf or rack 52. As long as the control switch 42 is maintained in this position, this upward movement will continue and the upward movement can be stopped and the shelf halted at an infinite number of positions within the limits of its travel from the position shown in the drawing to the upper limit of its travel which is reached when the upper surface of the abutment 50 engages the operating element of the upper limit switch 46 whereupon the source of power to the motor 31 is disconnected and the device comes to rest. Further upward movement of the movable shelf carrying assembly cannot take place despite the fact that the control switch 42 may remain in a position indicating further upward movement. This is the case, of course, because the limit switch 46 has disconnected the electric motor 31 from its source of power.

Downward movement of the shelf, however, can be achieved by moving the control switch 42 to a position indicating downward movement, since the downward limit switch 48 has been released as the abutment 50 travels with the cross member 30 upwardly towards the limit switch 46. Similarly, therefore, on the downward travel the control switch 42 can be released at any time to halt the shelf at any one of an infinite number of positions between the upper limit and the lower limit which is reached when the device assumes the condition shown in FIGURE 1 with the lower surface of the abutment 50 engaging the operating member of the lower limit switch 48.

The invention is herein concerned with the combination of a movable shelf carrying assembly of the type claimed and a driving assembly of the type claimed to produce the beneficial results of a power driven shelf for the oven of a cooking stove which can, within certain limits of distance, be adjusted to any one of an infinite number of positions by a remotely controlled electrical driving assembly.

The embodiment of the invention disclosed and the terminology employed in its description is intended to be illustrative of the inventive concept and is not to be construed in a limiting sense.

Modifications of the construction, configuration, and arrangement of parts is contemplated within the spirit of the invention and the scope of the claim in any manner that may be dictated by design considerations flowing from the use of the invention in a cooking stove having structural characteristics different from those of the rather schematic device illustrated.

It is to be noted that the illustration of the device has omitted a number of elements of conventional stove construction, none of which are considered to be essential to the present invention and none of which constitutes the invention of the applicant. As an example, it will be observed that brackets are provided which hold the oven walls in spaced relationship from the walls of the outer casing 10 and, as is conventional practice, this space between the oven and the outer casing would normally be filled with a heat insulating material in a manner conventional in stove construction.

Such aspects of stove construction as are omitted from both the drawings and the description are considered to be conventional and do not require detailed disclosure.

What I claim as my invention is:

In a cooking stove, an oven comprising a pair of opposed side walls, a rear wall, a top wall and a bottom wall secured to one another to define a stationary, enclosed space, the oven having a first pair of vertically aligned apertures, one in the bottom wall and one in the top wall of the oven and both adjacent the rear wall and one side wall, and a second pair of vertically aligned apertures, one in the bottom wall and one in the top wall of the oven and both adjacent the rear wall and the other side wall, a guide roller associated with each aperture in the bottom wall and lying on the side of the aperture adjacent the rear wall of the oven, a guide roller also associated with each aperture in the upper wall of the oven and lying on that side of the aperture remote from the rear wall of the oven, a pair of vertical columns, one column passing through the oven by means of each of the first and second pair of vertically aligned apertures and in contact with the guide rollers associated therewith, means engaging each column within the oven and adapted to support one side of a horizontal shelf, a cross member rigidly connecting the lower ends of the columns together externally of and below the oven, means fixed relative to the oven and in telescopic relationship with the lower ends of the columns to provide for a lower guide and support for the vertical columns against displacement in any horizontal direction and resilient means associated therewith to bias the columns upwardly against the force of gravity, a driving assembly comprising a reversible electric motor carried by a frame member of the stove and electrically connected to a source of power, switch means associated electrically with the motor to connect it with the source of power to drive the motor in either direction, a vertically arranged lead screw drivable by the electric motor to rotate about a vertical axis, the lead screw being journalled in a bracket carried by a frame member of the stove and fixed thereby against movement in the direction of its axis, nut means threaded on the lead screw, means carried by the cross member and embracing the nut means of the driving assembly to secure the nut means against rotation and to the cross member so that rotation of the motor and the lead screw will drive the nut along the lead screw and hence move the cross member, to the vertical columns and the shelf within the oven, and two vertically spaced and aligned limit switches electrically associated with the electric motor and its source of power and operable by an abutment on the cross member and vertically aligned with the limit switches to limit the distance through which the cross member, the columns and the shelf may be moved in either the upward or downward sense of the vertical direction.

References Cited in the file of this patent
UNITED STATES PATENTS

| | | |
|---|---|---|
| 1,212,341 | Fowler | Jan. 16, 1917 |
| 2,447,364 | Renshaw | Aug. 17, 1948 |
| 2,719,692 | Gredell | Oct. 4, 1955 |
| 2,841,459 | Sharpe | July 1, 1958 |
| 2,919,691 | Rinaldo et al. | Jan. 5, 1960 |
| 2,944,540 | Littell | July 12, 1960 |